March 19, 1963  F. W. FROMM ET AL  3,081,971
AIR-DROP PLATFORM AZIMUTH CONTROL
Filed Jan. 23, 1961  2 Sheets-Sheet 1

INVENTORS
FREDERICK W. FROMM
HAROLD S. SWEET
By
Agent

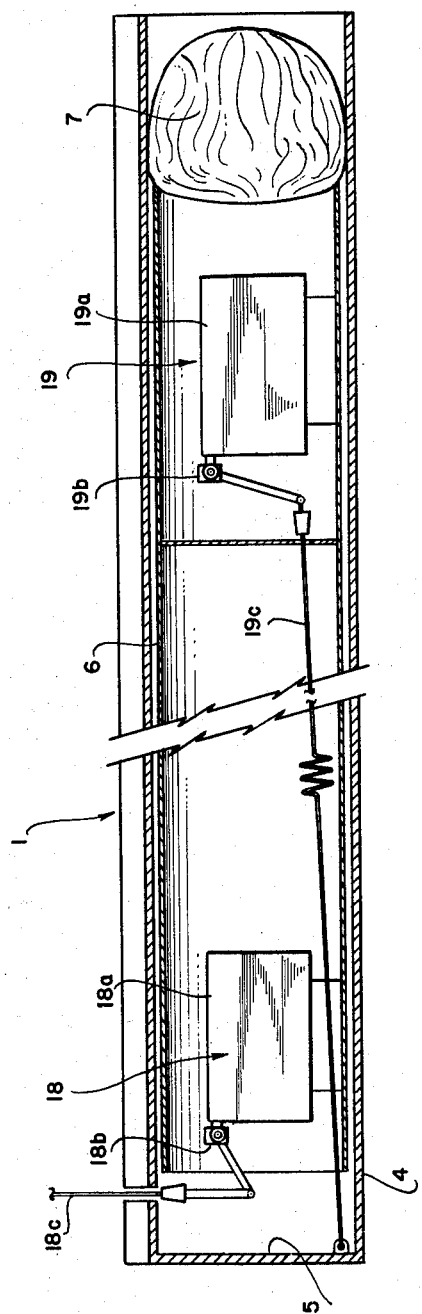

United States Patent Office 3,081,971
Patented Mar. 19, 1963

3,081,971
AIR-DROP PLATFORM AZIMUTH CONTROL
Frederick W. Fromm, Dunwoody, and Harold S. Sweet, Marietta, Ga., assignors to Lockheed Aircraft Corporation, Burbank, Calif.
Filed Jan. 23, 1961, Ser. No. 83,975
6 Claims. (Cl. 244—138)

This invention relates to an aerial drop or delivery platform, and more particularly to a platform with means for maintaining the longitudinal axis of an aerial drop platform parallel to the wind direction.

Those persons skilled in the art are familiar with various types of load carrying platforms or pallets that are discharged or dropped from an aircraft and lowered to the ground by means of parachutes. Other methods of controlling the descent of a load carrying platform or container are also known and have been suggested, such as exemplified by rotating airfoils affixed to the load or platform that act as auto-rotating devices; which is complicated, costly and cumbersome. Use of prior art devices is further objectionable as there are no provisions for controlling oscillations or erratic movements imparted to the loaded platform when the platform is discharged or released from an aircraft for correcting rotational movement of the load which, on landing, could be destructive thereto. Furthermore, the above mentioned prior art devices lack any positive control of maintaining the long or longitudinal axis of the loaded platform parallel to the wind direction, which is of importance upon landing to prevent possible toppling of the load due to wind forces acting substantially in parallel with the narrow beam or width axis.

A parachute or rotating airfoil in themselves cannot control the heading or attitude of an air-dropped platform, but can only control the rate of descent.

As aircraft speeds have increased, the adverse effects of undesirable attitudes imparted to an air-dropped platform have become more severe and, as a result, the cargo on the platform ofttimes is seriously damaged or even destroyed on contact with the ground. An excessive rotational movement imparted to the loaded air-dropped platform can, and often does, cause the platform to upset, topple over or tumble when ground contact is made. Even if the load is not damaged or destroyed, the attitude or position of the platform can cause extreme difficulties in releasing the load. For instance, equipment such as a truck, personnel carriers, earth moving equipment and ordnance can, if upset, be entirely eliminated from immediate use and as a consequence the advantages expected from air-dropping the equipment may be entirely eliminated.

If a platform is dropped from a great enough height, there can be enough time for the effects of air resistance and gravity to dampen the unwanted and destructive erratic movements. When due to terrain or time, however, a drop from an extremely low altitude is necessary, there will not be sufficient time for either the effects of air resistance or gravity to dampen the erratic movements and as a result there is a need for a means to rapidly correct and control the movements of the platform.

Accordingly, it is an object of this invention to provide an air-dropped platform that will orient itself with the air stream.

It is another object of this invention to provide an air-droppable cargo platform that will have a large degree of longitudinal stability during descent and after landing.

A still further object of the present invention is to provide a means of azimuth control for an air-droppable platform that is positive and automatic in operation and one that is readily adapted to platforms of various design configurations.

Other objects and advantages will become apparent from the following description taken in connection with the accompanying drawings showing one embodiment of the invention in which:

FIGURE 6 is a partially sectional side view of the delivery platform of FIGURE 1.

Figure 1:
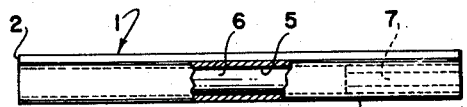
FIGURE 1 is an elevation view of an aerial delivery platform of one embodiment of this invention with the directional control means retracted.
Figure 2:
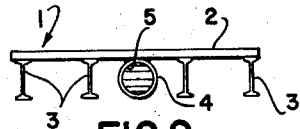
FIGURE 2 is an end view of the platform of FIGURE 1.

Generally stated, the invention comprises at least one cylinder or chamber located parallel to one of the axes of an aerial drop platform or pallet, the cylinder containing a boom which cooperates therewith functionally as a piston. An inflatable structure is connected at one end of the boom or piston, which is inflated as the boom or piston is extended out of the cylinder upon dropping from an aircraft, the inflated structure serving to dampen any gyrations of the platform about a vertical axis and align the direction of the platform relative to wind forces encountered during the drop.

Referring more specifically to FIGURES 1 through 4 of the drawings, a platform or pallet 1 is formed by a top panel member 2 with any appropriate or necessary strengthening or support members 3 forming a base therefor. A cylinder 4 having an inner compartment 5 is located longitudinally along the bottom of members 2 and serves as a container for a piston or boom 6 and a fin 7. Boom 6, which may be of any appropriate unitary or telescoping structure, is extendable from cylinder 5 as can best be seen in FIGURES 3 and 4. Fin 7 is an inflatable-deflatable structure which is deflated when stowed in cylinder 5 as can best be seen in FIGURES 1 and 2, and which is inflated upon extension of boom 6 as can best be seen in FIGURES 3 and 4.

Figure 5:
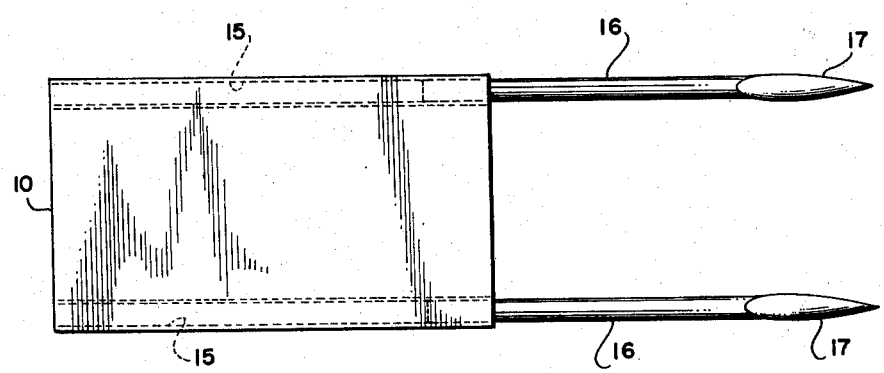
FIGURE 5 is a view similar to FIGURE 3 of another embodiment of this invention.

FIGURE 5 shows another embodiment of the invention wherein a pair of cylinders 15 are aligned parallel one on each of two opposite sides of a platform 10. Each cylinder 15 has a boom 16 and fin 17 therein to provide greater stabilization effect on the platform 10.

In operation, the platform 1 having a load secured on panel 2 will have a parachute of a size sufficient to lower the loaded platform secured thereto in any suitable manner.

On ejection of the platform 1 from the aircraft, the boom 6 and fin 7 are extended from compartment 5 of cylinder 4 in any desired manner by extending means 18 which may be a pneumatic pressure device, mechanical linkage, a mechanical spring means, explosive squib, etc.

Figure 3:
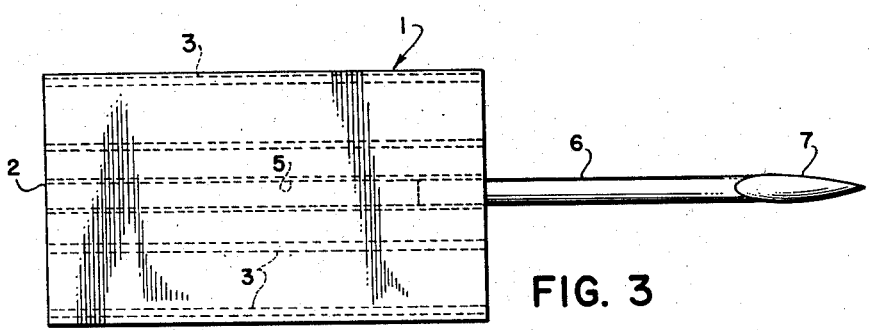
FIGURE 3 is a plan view of the platform of FIGURE 1 with the directional control means extended.
Figure 4:
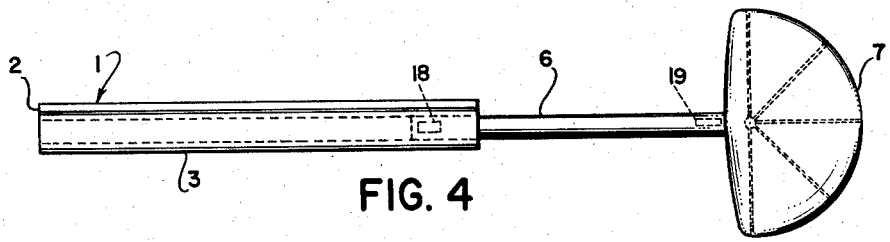
FIGURE 4 is an elevational view of the platform of FIGURE 1 with the directional control means extended.

After the boom 6 has been fully extended, inflating means 19 which may be an air bottle or $CO_2$ container is automatically opened and the fluid pressure released thereby is ducted to and released into the deflated fin 7 causing it to expand into the fully inflated position as shown in FIGURES 3 and 4.

Aerodynamic forces acting on the fin 7 will orient the platform 2 so that it heads into the wind thereby modulating any yawing tendencies that may be imparted to the platform 2 on its ejection from the carrying aircraft. By way of a specific example of a suitable means for extending the boom 6 and inflating the fin 7 there is shown in FIGURE 6 the extending means 18 comprising a conventional air bottle 18a mounted in boom 6 having a conventional pivotally actuated valve 18b. A break away lanyard 18c is connected at one end within the aircraft and at the other end to the actuator of valve 18b. The inflating means 19 comprises a conventional air bottle 19a mounted in boom 6 having a conventional pivotally actuated valve 19b. A lanyard 19c is connected at one end to the end wall of cylinder 4 and at the other end to the actuator of valve 19a. In operation, when the platform 1 is pushed from the aircraft the lanyard 18c opens valve 18b as the lanyard draws taut and then breaks a short time thereafter. The boom 6 is therefore extended from compartment 5 by pneumatic pressure until it reaches its fully extended position at which time it is prevented from further extension by suitable locking means. As the boom 6 approaches its fully extended position, the lanyard 19c is drawn taut to open the valve 19b to thereby inflate the fin 7.

Thus, it can be seen that with the incorporation of the extendable boom to the aerial drop platform there is provided a substantial improvement of the effects of aerial dropping on drop cargoes by reducing, if not eliminating, damage thereto from oscillatory yawing during descent which causes substantial shocks to loads upon ground impact. Also, by alignment of the boom with a longitudinal axis of the platform the toppling possibilities of the load from surface wind when the load is on the ground are reduced, for the stabilizing means tends to align the load with the wind to avoid a cross-wind effect thereon.

While specific embodiments of the invention have been illustrated and described, it will be obvious to those skilled in the art that various changes and modifications may be made without departing from the invention and it is intended to cover in the appended claims all such modifications and equivalents that fall within the true spirit and scope of this invention.

What is claimed is:

1. In combination: an aerial drop cargo platform with a directional control stabilizing means comprising a boom mounted to the platform and extendable therefrom, and an inflatable fin on the end of the boom, said boom and fin cooperating with the platform when extended and inflated to stabilize the platform during aerial drop in alignment with wind forces.

2. In combination: an aerial drop cargo platform with a directional control stabilizing means comprising a boom mounted to the platform and extendable therefrom, a means guiding the extension of said boom, and an inflatable fin on the end of the boom, said boom and fin cooperating with the platform when extended and inflated to stabilize the platform during aerial drop in alignment with wind forces.

3. In combination: an aerial drop cargo platform with a directional control stabilizing means comprising a cylinder mounted to the platform, a piston within the cylinder and extendable therefrom to project beyond the planform edge of the platform, an inflatable fin means on the end of the piston, said piston and fin means arranged relative to the platform so when extended and inflated they stabilize the platform during aerial drop in alignment with any wind forces.

4. In combination: an aerial drop cargo platform with a directional control stabilizing means comprising; at least one cylinder mounted to the platform substantially parallel to the platform plane, a piston within the cylinder and extendable therefrom to project beyond an edge of the platform substantially parallel to the platform plane, an inflatable fin means mounted on the end of the piston normal to the platform plane, during aerial drop said piston being extended, and said fin being inflated and extending normally with respect to the platform plane to stabilize the platform in alignment with wind forces.

5. In combination: a control stabilizing means adapted to be secured to a structure operating in a fluid medium comprising: an extendable boom and an inflatable fin on the end of said boom operative to stabilize the structure in the fluid medium.

6. A directional control stabilizing means comprising a cylinder, a piston, an inflatable fin secured to one end of said piston, said piston and said fin being extendably mounted within said cylinder, means for extending said piston and said fin from said cylinder and means for inflating said fin preparatory to the use thereof.

References Cited in the file of this patent
UNITED STATES PATENTS

| | | |
|---|---|---|
| 1,885,570 | Van Meter | Nov. 1, 1932 |
| 2,686,323 | McCarty et al. | Aug. 17, 1954 |
| 2,702,680 | Heinemann et al. | Feb. 22, 1955 |

OTHER REFERENCES

"Aviation Week" magazine, August 26, 1957 (pages 30 and 31).

Flight Magazine, May 30, 1958 (page 732).